US011176244B2

(12) United States Patent
Chai et al.

(10) Patent No.: US 11,176,244 B2
(45) Date of Patent: Nov. 16, 2021

(54) CLOUD APPLICATION DETECTION METHOD AND CLOUD APPLICATION DETECTION APPARATUS

(71) Applicant: HUAWEI TECHNOLOGIES CO., LTD., Guangdong (CN)

(72) Inventors: Dongyan Chai, Shenzhen (CN); Shengjun Tang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 16/230,555

(22) Filed: Dec. 21, 2018

(65) Prior Publication Data

US 2019/0121965 A1   Apr. 25, 2019

Related U.S. Application Data

(63) Continuation of application No. PCT/CN2017/072725, filed on Jan. 26, 2017.

(30) Foreign Application Priority Data

Jun. 23, 2016   (CN) .......................... 201610463783.6

(51) Int. Cl.
  *G06F 21/53*   (2013.01)
  *G06F 21/56*   (2013.01)
  (Continued)

(52) U.S. Cl.
  CPC ............ *G06F 21/53* (2013.01); *G06F 21/552* (2013.01); *G06F 21/554* (2013.01); *G06F 21/56* (2013.01);
  (Continued)

(58) Field of Classification Search
  CPC .......... G06F 21/53; G06F 21/56; G06F 21/57; G06F 21/552; G06F 21/554; G06F 21/566; G06F 21/577; G06F 2221/034
  See application file for complete search history.

(56) References Cited

U.S. PATENT DOCUMENTS 9,047,107 B2   6/2015   Walsh et al.
9,112,682 B2   8/2015   Wood et al.
(Continued)

FOREIGN PATENT DOCUMENTS

CN   102346828 A   2/2012
CN   103533023 A   1/2014
(Continued)

OTHER PUBLICATIONS

Office Action issued in Chinese Application No. 201610463783.6 dated Dec. 18, 2019, 5 pages.
(Continued)

*Primary Examiner* — Baotran N To
(74) *Attorney, Agent, or Firm* — Fish & Richardson P.C.

(57) ABSTRACT

Embodiments of this application disclose a cloud application detection method, including: obtaining at least one application instance corresponding to a to-be-detected cloud application, where the application instance corresponds one-to-one to a guard agent; extracting, by using the guard agent, a first characteristic value corresponding to each application instance; updating the first characteristic value to a second characteristic value when the to-be-detected cloud application meets a preset characteristic value update condition; and determining the to-be-detected cloud application as a target cloud application with security vulnerability if second characteristic values are inconsistent. This application further discloses a cloud application detection apparatus. integrity protection during running can be provided for a cloud application deployed on a platform as a service. Therefore,
(Continued)

the cloud application and a running environment of the cloud application are prevented from being maliciously tampered with or from abnormal running, user experience is improved.

17 Claims, 10 Drawing Sheets

(51) Int. Cl.
G06F 21/57 (2013.01)
G06F 21/55 (2013.01)

(52) U.S. Cl.
CPC ............ *G06F 21/566* (2013.01); *G06F 21/57* (2013.01); *G06F 21/577* (2013.01); *G06F 2221/034* (2013.01)

(56) References Cited

U.S. PATENT DOCUMENTS

| | | | |
|---|---|---|---|
| 9,223,961 B1* | 12/2015 | Sokolov | ................ G06F 21/51 |
| 2012/0240212 A1 | 9/2012 | Wood et al. | |
| 2013/0227561 A1 | 8/2013 | Walsh et al. | |
| 2015/0205949 A1 | 7/2015 | Iskin et al. | |
| 2015/0319185 A1* | 11/2015 | Kirti | ..................... H04L 67/306 |
| | | | 726/23 |
| 2016/0110549 A1* | 4/2016 | Schmitt | ..................... G06F 8/43 |
| | | | 726/25 |
| 2017/0264637 A1 | 9/2017 | Meng et al. | |

FOREIGN PATENT DOCUMENTS

| | | |
|---|---|---|
| CN | 103701922 A | 4/2014 |
| CN | 103716182 A | 4/2014 |
| CN | 103984600 A | 8/2014 |
| CN | 104392175 A | 3/2015 |
| CN | 105245373 A | 1/2016 |
| WO | 2015038944 A1 | 3/2015 |

OTHER PUBLICATIONS

International Search Report, dated May 2, 2017, in International Application No. PCT/CN2017/072725 (4 pp.).
Written Opinion of the International Searching Authority, dated May 2, 2017, in International Application No. PCT/CN2017/072725 (8 pp.).
International Search Report dated May 2, 2017 in corresponding International Application No. PCT/CN2017/072725.

* cited by examiner

CLOUD APPLICATION DETECTION METHOD AND CLOUD APPLICATION DETECTION APPARATUS

CROSS-REFERENCE TO RELATED APPLICATIONS

This application is a continuation of International Application No. PCT/CN2017/072725, filed on Jan. 26, 2017, which claims priority to Chinese Patent Application No. 201610463783.6, filed on Jun. 23, 2016. The disclosures of the aforementioned applications are hereby incorporated by reference in their entireties.

TECHNICAL FIELD

This application relates to the field of computer technologies, and in particular, to a cloud application detection method and a cloud application detection apparatus.

BACKGROUND

According to a definition of the National Institute of Standards and Technology (English full name: National Institute of Standards and Technology, NIST for short), cloud computing is classified into three service modes: infrastructure as a service (English full name: infrastructure as a service, IaaS for short), software as a service (English full name: software as a service, SaaS for short), and platform as a service (English full name: platform as a service, PaaS for short). The PaaS provides an application developer with development and running environment support including various types of middleware covering a wide range, so that the developer does not need to maintain infrastructure configuration and management in person, nor install and manage a running environment. The application developer only needs to deploy application program code on the PaaS, and the PaaS is responsible for application running maintenance and application life cycle management. A basic function that the PaaS needs to promise a user is to ensure that a hosted cloud application runs securely and steadily on the platform.

Currently, for security protection of cloud application integrity, an intrusion detection system (English full name: Intrusion Detection Systems, IDS for short) may be used to detect an attack action targeting at an application, a system in which the application is, and a network environment of the application. The IDS may include host-based detection and network-based detection. The host-based detection is mainly used for analyzing and auditing network data of a single host, to find a possible intrusion action, and the network-based detection is similar to a firewall and is used for analyzing traffic data of an entire network.

However, in the security protection performed on the cloud application integrity based on the IDB, a false negative case may occur, not all intrusion actions can be successfully recognized, and only a possible intrusion action can be found. Therefore, the IDB needs to be improved. In addition, application integrity may be damaged due to a system software or hardware fault or the like. Because this is not caused by an abnormal intrusion action, the IDB does not perform processing. Consequently, it is difficult to ensure that a solution is real-time and flexible.

SUMMARY

Embodiments of this application provide a cloud application detection method and a cloud application detection apparatus, so as to provide integrity protection during running for a cloud application deployed on a PaaS platform, update a first characteristic value of the cloud application during running, obtain a second characteristic value after the updating, and further determine consistency of second characteristic values, so as to find, in time, whether the cloud application has security vulnerability. Therefore, a security service capability of the PaaS platform is improved, market competitiveness is improved, and a user can learn a running status of the cloud application in time, so that the cloud application and a running environment of the cloud application are prevented from being maliciously tampered with or from abnormal running, user experience is improved, and a cloud service function is enhanced.

In view of this, a first aspect of this application provides a control device access method, and the method includes the following content:

First, a cloud application detection apparatus obtains at least one application instance corresponding to a to-be-detected cloud application, and each application instance corresponds to one guard agent. The guard agent may extract and calculate an integrity characteristic value of the application instance, and may further be responsible for information exchange between application instances, and the guard agent can record and update an characteristic value database in time.

Then, the cloud application detection apparatus may extract, by using the guard agent, a first characteristic value corresponding to each application instance, where the first characteristic value is an initialized characteristic value.

During running of the cloud application, the cloud application detection apparatus updates the first characteristic value to a second characteristic value if it is determined that the to-be-detected cloud application meets a preset characteristic value update condition.

The cloud application detection apparatus may determine the to-be-detected cloud application as a target cloud application with security vulnerability if second characteristic values of the application instances are inconsistent.

According to the cloud application detection method provided in the embodiment of this application, the cloud application detection apparatus first obtains the at least one application instance corresponding to the to-be-detected cloud application, where the application instance corresponds one-to-one to the guard agent; then extracts, by using the guard agent, the first characteristic value corresponding to each application instance; may update the first characteristic value to the second characteristic value when the to-be-detected cloud application meets the preset characteristic value update condition; and determines the to-be-detected cloud application as the target cloud application with security vulnerability if the second characteristic values are inconsistent. According to the foregoing method, integrity protection during running can be provided for a cloud application deployed on a PaaS platform, a first characteristic value of the cloud application is updated during running, a second characteristic value is obtained after the updating, and further consistency of second characteristic values is determined, so as to find, in time, whether the cloud application has security vulnerability. Therefore, a security service capability of the PaaS platform is improved, market competitiveness is improved, and a user can learn a running status of the cloud application in time, so that the cloud application and a running environment of the cloud application are prevented from being maliciously tampered with or from abnormal running, user experience is improved, and a cloud service function is enhanced.

With reference to the first aspect of the embodiment of this application, in a first possible implementation, after the cloud application detection apparatus extracts, by using the guard agent, the first characteristic value corresponding to each application instance, the method may further include the following content:

The cloud application detection apparatus may save the first characteristic value in the characteristic value database. The characteristic value database is mainly used to save various types of characteristic values of the application instance, and the first characteristic values, that is, initial characteristic values, saved in the characteristic value database need to be consistent.

In addition, in this embodiment of this application, after extracting, by using the guard agent, the first characteristic value corresponding to each application instance, the cloud application detection apparatus may further save the first characteristic value in the characteristic value database. All the first characteristic values that are corresponding to the application instances and that are saved in the characteristic value database are consistent. In the foregoing manner, consistent first characteristic values are saved in the characteristic value database, to facilitate subsequent characteristic value update, and characteristic values are saved in the characteristic value database in a unified manner, so that feasibility and utility of the solution are improved.

With reference to the first aspect of the embodiment of this application, in a second possible implementation, that the cloud application detection apparatus updates the first characteristic value to a second characteristic value when the to-be-detected cloud application meets a preset characteristic value update condition may include the following content:

The cloud application detection apparatus determines whether configuration or code corresponding to the to-be-detected cloud application changes, and if the configuration or the code corresponding to the to-be-detected cloud application changes, considers that the characteristic value of the cloud application needs to be updated, that is, determines that the to-be-detected cloud application meets the preset characteristic value update condition.

The cloud application detection apparatus needs to update a first characteristic value that is of the cloud application and whose configuration or code changes, and the cloud application detection apparatus may determine, according to the first characteristic value corresponding to each application instance, the second characteristic value that is corresponding to the application instance and that is obtained after the updating.

In addition, in this embodiment of this application, a condition for updating the first characteristic value is provided, that is, the cloud application detection apparatus first determines whether the configuration or code corresponding to the to-be-detected cloud application changes, and if the configuration or the code corresponding to the to-be-detected cloud application changes, determines that the to-be-detected cloud application meets the preset characteristic value update condition; and then the cloud application detection apparatus may determine, according to the first characteristic value corresponding to each application instance, the second characteristic value corresponding to the application instance. In the foregoing manner for triggering update of the first characteristic value, each time the first characteristic value is updated, the cloud application detection apparatus may know that the first characteristic value changes, so that the second characteristic value after the changing is obtained. Therefore, a success rate of updating an characteristic value is improved, and computing resources of the cloud application detection apparatus are reduced.

With reference to the first aspect of the embodiment of this application, in a third possible implementation, that the cloud application detection apparatus updates the first characteristic value to a second characteristic value when the to-be-detected cloud application meets a preset characteristic value update condition may include the following content:

The cloud application detection apparatus determines whether a runtime of the to-be-detected cloud application exceeds a preset time, and if the runtime of the cloud application exceeds the preset time, considers that the characteristic value of the cloud application needs to be updated periodically, that is, determines that the to-be-detected cloud application meets the preset characteristic value update condition.

The cloud application detection apparatus needs to update a first characteristic value that is of the cloud application and whose runtime exceeds the preset time, and the cloud application detection apparatus may determine, according to the first characteristic value corresponding to each application instance, the second characteristic value that is corresponding to the application instance and that is obtained after the updating.

With reference to the first aspect of the embodiment of this application, in a fourth possible implementation, that the cloud application detection apparatus updates the first characteristic value to a second characteristic value may include the following content:

The cloud application detection apparatus sends an characteristic value update request to each application instance by using the guard agent, where the characteristic value update request is used for updating the first characteristic value after each application instance receives the request.

When each application instance responds to the characteristic value update request, the cloud application detection apparatus can receive the second characteristic value that is of each application instance and that is obtained after the updating.

In addition, in this embodiment of this application, the cloud application detection apparatus may first send the characteristic value update request to each application instance by using the guard agent. The characteristic value update request is used for updating the first characteristic value for each application instance, and when each application instance responds to the characteristic value update request, the second characteristic value that is of each application instance and that is obtained after the updating is received. Updating the first characteristic value to the second characteristic value for each application instance is triggered in the foregoing manner, so that operability of the solution is improved.

With reference to the first aspect of the embodiment of this application, in a fifth possible implementation, after the cloud application detection apparatus updates the first characteristic value to the second characteristic value, the method may further include the following content:

After each application instance receives an characteristic value update request, and updates the first characteristic value according to the request, the second characteristic value is obtained, and in this case, the cloud application detection apparatus may save, in the characteristic value database, the second characteristic value obtained after the updating. Usually, the first characteristic value in this case is overwritten by the second characteristic value.

In addition, in this embodiment of this application, after updating the first characteristic value to the second characteristic value, the cloud application detection apparatus may further save the second characteristic value in the characteristic value database, so that data in the characteristic value database is updated. In the foregoing manner, after the first characteristic value is updated, the second characteristic value is saved in the characteristic value database, and may overwrite the original first characteristic value to facilitate subsequent characteristic value comparison, so that application efficiency of the solution is improved.

With reference to the fifth possible implementation of the first aspect of the embodiment of this application, in a sixth possible implementation, the step of determining, by the cloud application detection apparatus, the to-be-detected cloud application as a target cloud application with security vulnerability if second characteristic values are inconsistent specifically includes the following content:

The cloud application detection apparatus compares the second characteristic value of the application instance with a second characteristic value saved in the characteristic value database one by one, where each application instance includes at least one second characteristic value.

The cloud application detection apparatus may determine the to-be-detected cloud application as the target cloud application with security vulnerability if more than N second characteristic values of the application instance are inconsistent with the second characteristic value saved in the characteristic value database, where N is a positive number greater than or equal to 1.

Further, in this embodiment of this application, a manner for determining, by the cloud application detection apparatus, whether the cloud application has security vulnerability may be: first, comparing the second characteristic value of the application instance with the second characteristic value saved in an characteristic value database, where the application instance includes the at least one second characteristic value; and determining the to-be-detected cloud application as the target cloud application with security vulnerability if more than N second characteristic values of the application instance are inconsistent with the second characteristic value saved in the characteristic value database, where N is a positive number greater than or equal to 1. In the foregoing manner for detecting whether the cloud application has security vulnerability, on the one hand, when N is equal to 1, once it is detected that second characteristic values are inconsistent, it is tentatively determined that the cloud application has security vulnerability, so as to improve security of the solution; on the other hand, if N is greater than 1, detection may be performed in a manner that the minority is subordinate to the majority, that is, when a quantity of inconsistent second characteristic values of the application instances is greater than a quantity of consistent second characteristic values, it is considered that the cloud application has security vulnerability, so as to reduce a result of security vulnerability, and improve efficiency of further detection.

With reference to any one of the first aspect of the embodiment of this application or the first to the sixth possible implementations of the first aspect, in a seventh possible implementation, after the cloud application detection apparatus determines the to-be-detected cloud application as the target cloud application with security vulnerability, the method may further include the following content:

The cloud application detection apparatus sends a security alarm for the target cloud application to a client, and a user learns, by using the client, that the currently-running target cloud application has security vulnerability, and may process the target cloud application manually or according to a preset processing rule, where the security alarm may be usually displayed on the client by using a pop-up window; or the cloud application detection apparatus may migrate the target cloud application, where a migration scheme is assessed before migration, to ensure successful migration; or the cloud application detection apparatus may resave the target cloud application, and specifically, data of the cloud application may be resaved, where the data includes data saved in the characteristic value database and the data of the cloud application, and data restoration may be classified into software fault data restoration and hardware fault data restoration.

Further, in this embodiment of this application, after determining the to-be-detected cloud application as the target cloud application with security vulnerability, the cloud application detection apparatus may send the security alarm for the target cloud application to the client, or migrate the target cloud application, or resave the target cloud application. In the foregoing manner, appropriate processing can be performed on the target cloud application with security vulnerability in time, so that the target cloud application with security vulnerability is found as early as possible, potential risk spreading is prevented, and security of the solution is improved.

A second aspect of this application provides a cloud application detection apparatus, including:

an obtaining module, configured to obtain at least one application instance corresponding to a to-be-detected cloud application, where the application instance corresponds one-to-one to a guard agent;

an extraction module, configured to extract, by using the guard agent, a first characteristic value corresponding to each application instance obtained by the obtaining module;

an update module, configured to update the first characteristic value extracted by the extraction module to a second characteristic value when the to-be-detected cloud application meets a preset characteristic value update condition; and a determining module, configured to determine the to-be-detected cloud application as a target cloud application with security vulnerability if the second characteristic values obtained by the update module by means of updating are inconsistent.

With reference to the second aspect of the embodiment of this application, in a first possible implementation, the cloud application detection apparatus further includes:

a first storage module, configured to save the first characteristic value in an characteristic value database after the extraction module extracts, by using the guard agent, the first characteristic value corresponding to each application instance, where all the first characteristic values that are corresponding to the application instances and that are saved in the characteristic value database are consistent.

With reference to the second aspect of the embodiment of this application, in a second possible implementation, the update module includes:

a first judgment unit, configured to: determine whether configuration or code corresponding to the to-be-detected cloud application changes, and if the configuration or the code corresponding to the to-be-detected cloud application changes, determine that the to-be-detected cloud application meets the preset characteristic value update condition; and a first determining unit, configured to: after the first judgment unit determines that the to-be-detected cloud application meets the preset characteristic value update condition, determine, according to the first characteristic value corresponding to each application instance, the second characteristic value corresponding to the application instance.

With reference to the second aspect of the embodiment of this application, in a third possible implementation, the update module includes:

a second judgment unit, configured to: determine whether a runtime of the to-be-detected cloud application exceeds a preset time, and if the runtime of the to-be-detected cloud application exceeds the preset time, determine that the to-be-detected cloud application meets the preset characteristic value update condition; and a second determining unit, configured to: after the second judgment unit determines that the to-be-detected cloud application meets the preset characteristic value update condition, determine, according to the first characteristic value corresponding to each application instance, the second characteristic value corresponding to the application instance.

With reference to the second aspect of the embodiment of this application, in a fourth possible implementation, the update module includes:

a sending unit, configured to send an characteristic value update request to each application instance by using the guard agent, where the characteristic value update request is used for updating the first characteristic value for each application instance; and a receiving unit, configured to: when each application instance responds to the characteristic value update request sent by the sending unit, receive the second characteristic value that is of each application instance and that is obtained after the updating.

With reference to the second aspect of the embodiment of this application, in a fifth possible implementation, the cloud application detection apparatus further includes:

a second storage module, configured to save the second characteristic value in the characteristic value database after the update module updates the first characteristic value to the second characteristic value.

With reference to the fifth possible implementation of the second aspect of the embodiment of this application, in a sixth possible implementation, the determining module includes:

a comparison unit, configured to compare the second characteristic value of the application instance with a second characteristic value saved in the characteristic value database, where the application instance includes at least one second characteristic value; and a third determining unit, configured to determine the to-be-detected cloud application as the target cloud application with security vulnerability if it is learned, after the comparison unit performs the comparison, that more than N second characteristic values of the application instance are inconsistent with the second characteristic value saved in the characteristic value database, where N is a positive number greater than or equal to 1.

With reference to any one of the second aspect of the embodiment of this application or the first to the sixth possible implementations of the second aspect, in a seventh possible implementation, the cloud application detection apparatus further includes:

a processing module, configured to: after the to-be-detected cloud application is determined as the target cloud application with security vulnerability, send a security alarm for the target cloud application, or migrate the target cloud application, or resave the target cloud application.

A third aspect of the embodiment of this application provides a cloud application detection apparatus, including a memory, a transceiver, a processor, and a bus system, where the memory is configured to save a program; and the processor is configured to execute the program saved in the memory, and specific steps are as follows:

controlling the transceiver to obtain at least one application instance corresponding to a to-be-detected cloud application, where the application instance corresponds one-to-one to a guard agent;

extracting, by using the guard agent, a first characteristic value corresponding to each application instance;

updating the first characteristic value to a second characteristic value when the to-be-detected cloud application meets a preset characteristic value update condition; and determining the to-be-detected cloud application as a target cloud application with security vulnerability if second characteristic values are inconsistent.

With reference to the third aspect of the embodiment of this application, in a first possible implementation, the processor is further configured to save the first characteristic value in an characteristic value database, where all the first characteristic values that are corresponding to the application instances and that are saved in the characteristic value database are consistent.

With reference to the third aspect of the embodiment of this application, in a second possible implementation, the processor is specifically configured to: determine whether configuration or code corresponding to the to-be-detected cloud application changes, and if the configuration or the code corresponding to the to-be-detected cloud application changes, determine that the to-be-detected cloud application meets the preset characteristic value update condition; and determine, according to the first characteristic value corresponding to each application instance, the second characteristic value corresponding to the application instance.

With reference to the third aspect of the embodiment of this application, in a third possible implementation, the processor is specifically configured to: determine whether a runtime of the to-be-detected cloud application exceeds a preset time, and if the runtime of the to-be-detected cloud application exceeds the preset time, determine that the to-be-detected cloud application meets the preset characteristic value update condition; and determine, according to the first characteristic value corresponding to each application instance, the second characteristic value corresponding to the application instance.

With reference to the third aspect of the embodiment of this application, in a fourth possible implementation, the processor is specifically configured to: send an characteristic value update request to each application instance by using the guard agent, where the characteristic value update request is used for updating the first characteristic value for each application instance; and when each application instance responds to the characteristic value update request, receive the second characteristic value that is of each application instance and that is obtained after the updating.

With reference to the third aspect of the embodiment of this application, in a fifth possible implementation, the processor is further configured to save the second characteristic value in an characteristic value database.

With reference to the fifth possible implementation of the third aspect of the embodiment of this application, in a sixth possible implementation, the processor is specifically configured to: compare the second characteristic value of the application instance with a second characteristic value saved in the characteristic value database, where the application instance includes at least one second characteristic value; and determine the to-be-detected cloud application as the target cloud application with security vulnerability if more than N second characteristic values of the application instance are inconsistent with the second characteristic value saved in the characteristic value database, where N is a positive number greater than or equal to 1.

With reference to any one of the third aspect of the embodiment of this application or the first to the sixth possible implementations of the third aspect, in a seventh possible implementation, the processor is further configured to: send a security alarm for the target cloud application, or migrate the target cloud application, or resave the target cloud application.

It can be learned from the foregoing technical solutions that the embodiments of this application have the following advantages:

According to the cloud application detection method provided in the embodiments of this application, a cloud application detection apparatus first obtains at least one application instance corresponding to a to-be-detected cloud application, where the application instance corresponds one-to-one to a guard agent; then extracts, by using the guard agent, a first characteristic value corresponding to each application instance; may update the first characteristic value to a second characteristic value when the to-be-detected cloud application meets a preset characteristic value update condition; and determines the to-be-detected cloud application as a target cloud application with security vulnerability if second characteristic values are inconsistent. According to the foregoing method, integrity protection during running can be provided for a cloud application deployed on a PaaS platform, a first characteristic value of the cloud application is updated during running, a second characteristic value is obtained after the updating, and further consistency of second characteristic values is determined, so as to find, in time, whether the cloud application has security vulnerability. Therefore, a security service capability of the PaaS platform is improved, market competitiveness is improved, and a user can learn a running status of the cloud application in time, so that the cloud application and a running environment of the cloud application are prevented from being maliciously tampered with or from abnormal running, user experience is improved, and a cloud service function is enhanced.

DESCRIPTION OF EMBODIMENTS

Figure 1:
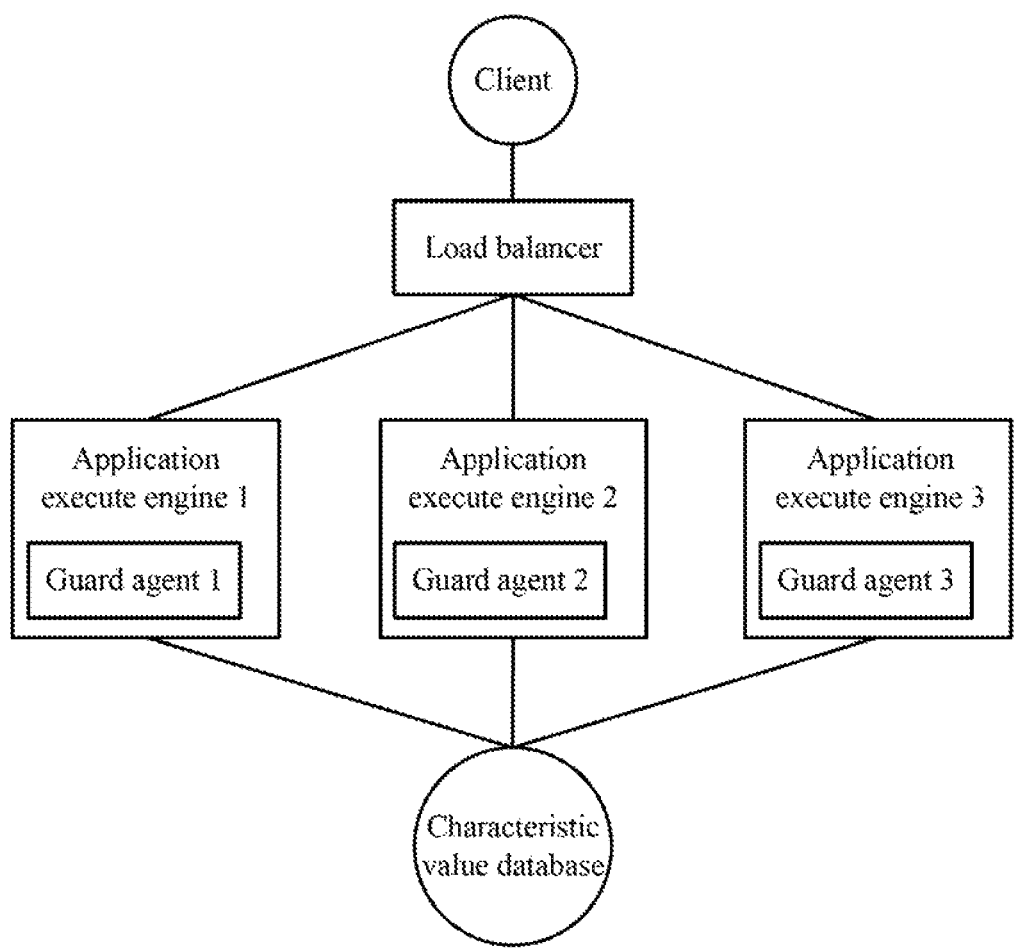
FIG. 1 is a schematic architecture diagram of a cloud application detection system in an embodiment of this application.

Embodiments of this application provide a cloud application detection method and a cloud application detection apparatus, so as to provide integrity protection during running for a cloud application deployed on a PaaS platform, update a first characteristic value of the cloud application during running, obtain a second characteristic value after the updating, and further determine consistency of second characteristic values, so as to find, in time, whether the cloud application has security vulnerability. Therefore, a security service capability of the PaaS platform is improved, market competitiveness is improved, and a user can learn a running status of the cloud application in time, so that the cloud application and a running environment of the cloud application are prevented from being maliciously tampered with or from abnormal running, user experience is improved, and a cloud service function is enhanced.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented in orders except the order illustrated or described herein. Moreover, the terms "include", "contain", and any other variants mean to cover the non-exclusive inclusion, for example, a process, method, system, product, or device that includes a list of steps or units is not necessarily limited to those units, but may include other units not expressly listed or inherent to such a process, method, system, product, or device.

It should be understood that the embodiments are mainly applied to a PaaS platform. PaaS is a cloud service between an IaaS model and a SaaS model, and provides an environment for developing and running an application program. IaaS mainly provides infrastructure services such virtual computing, storage, and a database. SaaS provides a user with a cloud-based application. The PaaS provides a developer with an environment for constructing an application program. With the help of the PaaS service, underlying hardware does not need to be considered overmuch, and it can be convenient to use many services, such as security authentication, that are necessary for constructing an application.

It should be noted that different PaaS services support different programming languages, such as Net, Java, and Ruby, and some PaaS supports multiple types of developing languages. This is not limited herein. A PaaS layer is located between the IaaS and the SaaS, and therefore, many IaaS and SaaS service providers naturally add the PaaS to their own services, to form a one-stop service system.

The PaaS can integrate various types of existing service capabilities that may be specifically classified into an application server, service capability access, a service enabler, and a service open platform. Downwards, a basic service capability is measured and calculated according to a service capability requirement, and a hardware resource is invoked by using an application programming interface (English full name: Application Programming Interface, API for short) provided by the IaaS. Upwards, a service scheduling center service is provided, various resources of the platform are monitored in real time, and these resources are open for a SaaS user by using the API. The PaaS mainly has the following three features.

(1) A most fundamental difference between a service provided by the PaaS and another service is that the PaaS provides a basic platform instead of a specific service. In a conventional concept, a platform is a basis for providing a service outward. Generally, the platform, as a basis for deploying an application system, is established and maintained by an application service provider, but for the PaaS, the basic platform is established and operated by a dedicated platform service provider, and the platform is provided for an application system operator in a service manner.

(2) A service that needs to be provided by a PaaS operator includes not only a basic platform, but also a technical support service for the platform, and even a service such as application system development and optimization performed on the platform.

(3) A service provided outward by a PaaS operator is different from another service, and the service is supported by a strong and stable basic operation platform and a professional technical support team. Such a "platform-level" service can ensure support for long-time and stable running of various application systems of a SaaS provider or another software service provider. Essence of the PaaS is servitizing an Internet resource to form a programmable interface, so as to provide a third-party developer with a resource and a service platform that have commercial values. With support from the PaaS platform, a cloud computing developer obtains a large quantity of programmable elements, and these programmable elements have specific service logic, so that development is greatly facilitated, and not only development efficiency is improved, but development costs are reduced. With support from the PaaS platform, an Internet application is developed more quickly, and a development capability of quickly responding to a user demand brings a real benefit to an end user.

Referring to FIG. 1, FIG. 1 is a schematic architecture diagram of a cloud application detection system in an embodiment of this application. As shown in the figure, the cloud application detection system mainly includes an application execute engine, an characteristic value database, and a load balancer. Each application execute engine further includes a guard agent, and the cloud application detection system may send a cloud application detection result to a client, so that both a cloud service provider and a cloud service user can learn cloud application security in time.

The application execute engine is a virtual machine or a container that is on a PaaS platform and that is used for deploying an application, or may be a physical machine. The virtual machine is an integrate computer system that is simulated by using software and that has all hardware system functions and runs in an absolutely isolated environment. The container is a running environment of a current cloud application. The physical machine is a name for an entity computer relative to the virtual machine. The physical machine cooperates with the virtual machine, so that multiple operating systems may be installed on one computer, and several operating systems may communicate with each other as if there were multiple computers.

The characteristic value database is a storage apparatus used to save an application integrity characteristic value.

The guard agent is deployed on the application execute engine together with the cloud application, is used to extract and calculate an integrity characteristic value, is responsible for information exchange between multiple instances, and records and updates the characteristic value database.

The load balancer is a hardware device or a software system used to perform application load balancing.

Figure 2:
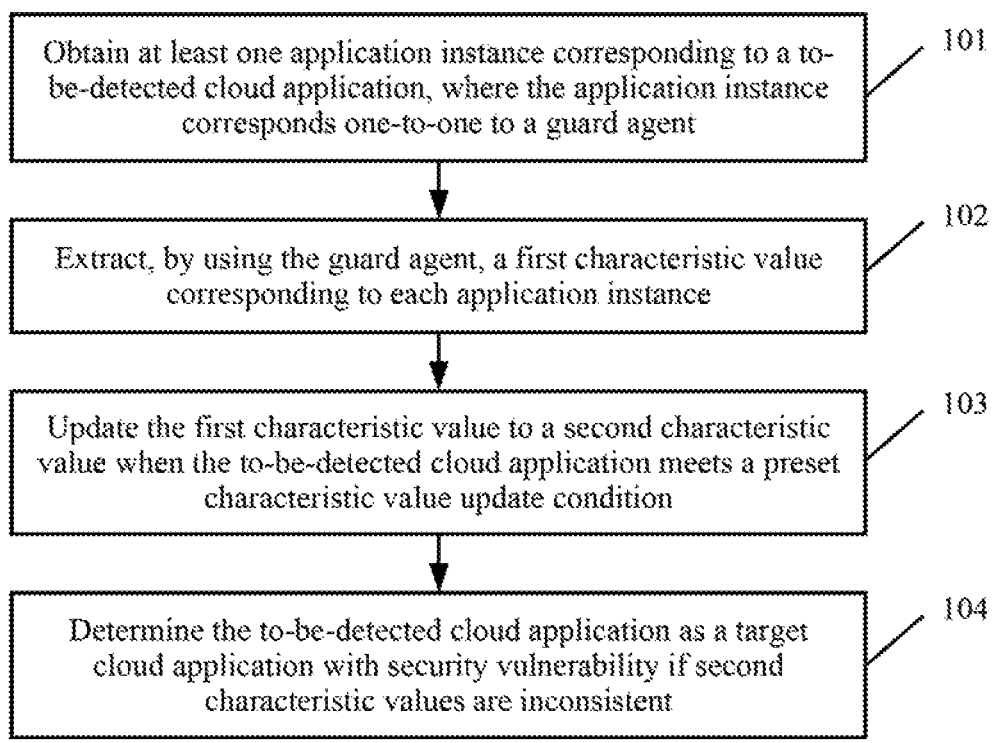
FIG. 2 is a schematic diagram of an embodiment of a cloud application detection method in an embodiment of this application.

Referring to FIG. 2, an embodiment of a cloud application detection method in an embodiment of this application includes the following steps.

101. Obtain at least one application instance corresponding to a to-be-detected cloud application, where the application instance corresponds one-to-one to a guard agent.

In this embodiment, a cloud application detection apparatus first obtains the at least one application instance corresponding to the to-be-detected cloud application, and each application instance corresponds to one guard agent.

The cloud application has many advantages such as a cross-platform feature, ease of use, and light weight, and can help a user in significantly reducing use costs and improving work efficiency.

The cloud application detection apparatus may include multiple servers, and each server may obtain one application instance. Certainly, multiple application instances may be obtained in actual application, and the application instances are multiple copies run by a same to-be-detected cloud application that runs on a PaaS platform.

Each copy run by the to-be-detected cloud application corresponds to a guard agent, the guard agent is deployed on an application execute engine, and the application execute engine is in the cloud application detection apparatus. The guard agent may extract and calculate an integrity characteristic value of an application instance, and may further be responsible for information exchange between application instances, and the guard agent can record and update an characteristic value database in time.

102. Extract, by using the guard agent, a first characteristic value corresponding to each application instance.

In this embodiment, according to content in the foregoing step 101, the guard agent may extract and calculate the integrity characteristic value of the application instance, so that the cloud application detection apparatus extracts, by using the guard agent, the first characteristic value corresponding to each application instance.

The first characteristic value is specifically an initialized characteristic value, that is, an initial characteristic value extracted by the guard agent from each application instance, and the guard agent can help with the information exchange between the application instances. Therefore, the initial characteristic value extracted from each application instance is exchanged between the application instances for verification, to finally obtain consistent first characteristic values.

103. Update the first characteristic value to a second characteristic value when the to-be-detected cloud application meets a preset characteristic value update condition.

In this embodiment, during running of the cloud application, if it is detected that the to-be-detected cloud application meets the preset characteristic value update condition, the guard agent in the cloud application detection apparatus records and updates the first characteristic value in time, and obtains the second characteristic value that is obtained after the first characteristic value is updated.

104. Determine the to-be-detected cloud application as a target cloud application with security vulnerability if second characteristic values are inconsistent.

In this embodiment, the cloud application detection apparatus compares second characteristic values of the application instances to determine whether the second characteristic values are consistent, and if a second characteristic value of a specific application instance is inconsistent with second characteristic values of other application instances or second characteristic values of multiple application instances are inconsistent with second characteristic values of other application instances, the to-be-detected cloud application is determined as the target cloud application with security vulnerability.

According to the cloud application detection method provided in this embodiment of this application, a cloud application detection apparatus first obtains at least one application instance corresponding to a to-be-detected cloud application, where the application instance corresponds one-to-one to a guard agent; then extracts, by using the guard agent, a first characteristic value corresponding to each application instance; may update the first characteristic value to a second characteristic value when the to-be-detected cloud application meets a preset characteristic value update condition; and determines the to-be-detected cloud application as a target cloud application with security vulnerability if second characteristic values are inconsistent. According to the foregoing method, integrity protection during running can be provided for a cloud application deployed on a PaaS platform, a first characteristic value of the cloud application is updated during running, a second characteristic value is obtained after the updating, and further consistency of second characteristic values is determined, so as to find, in time, whether the cloud application has security vulnerability. Therefore, a security service capability of the PaaS platform is improved, market competitiveness is improved, and a user can learn a running status of the cloud application in time, so that the cloud application and a running environment of the cloud application are prevented from being maliciously tampered with or from abnormal running, user experience is improved, and a cloud service function is enhanced.

Optionally, based on the embodiment corresponding to FIG. 2, in a first optional embodiment of the cloud application detection method provided in the embodiment of this application, after the extracting, by using the guard agent, a first characteristic value corresponding to each application instance, the method may further include:

saving the first characteristic value in an characteristic value database, where all the first characteristic values that are corresponding to the application instances and that are saved in the characteristic value database are consistent.

In this embodiment, after extracting, by using a guard agent, a first characteristic value corresponding to each application instance, a cloud application detection apparatus may save the first characteristic value in an characteristic value database. The characteristic value database is mainly used to save various types of characteristic values of the application instance, and the first characteristic values, that is, initial characteristic values, saved in the characteristic value database need to be consistent.

Figure 3:
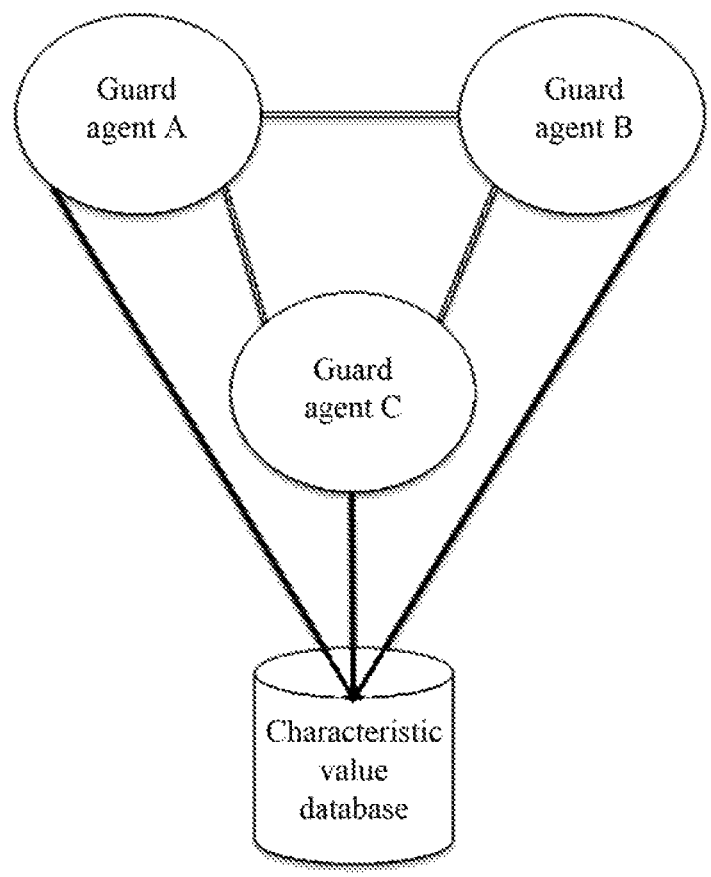
FIG. 3 is a schematic diagram of a guard agent cluster in an embodiment of this application.

Specifically, referring to FIG. 3, FIG. 3 is a schematic diagram of a guard agent cluster in an embodiment of this application. As shown in the figure, a guard agent of a cloud application is deployed on each application execute engine. It is assumed that there are three application instances: an application instance A, an application instance B, and an application instance C that respectively correspond to a guard agent A, a guard agent B, and a guard agent C. The guard agent A, the guard agent B, and the guard agent C form a guard agent cluster, share one characteristic value database, and exchange characteristic value data with each other by sending a notification message.

Figure 4:
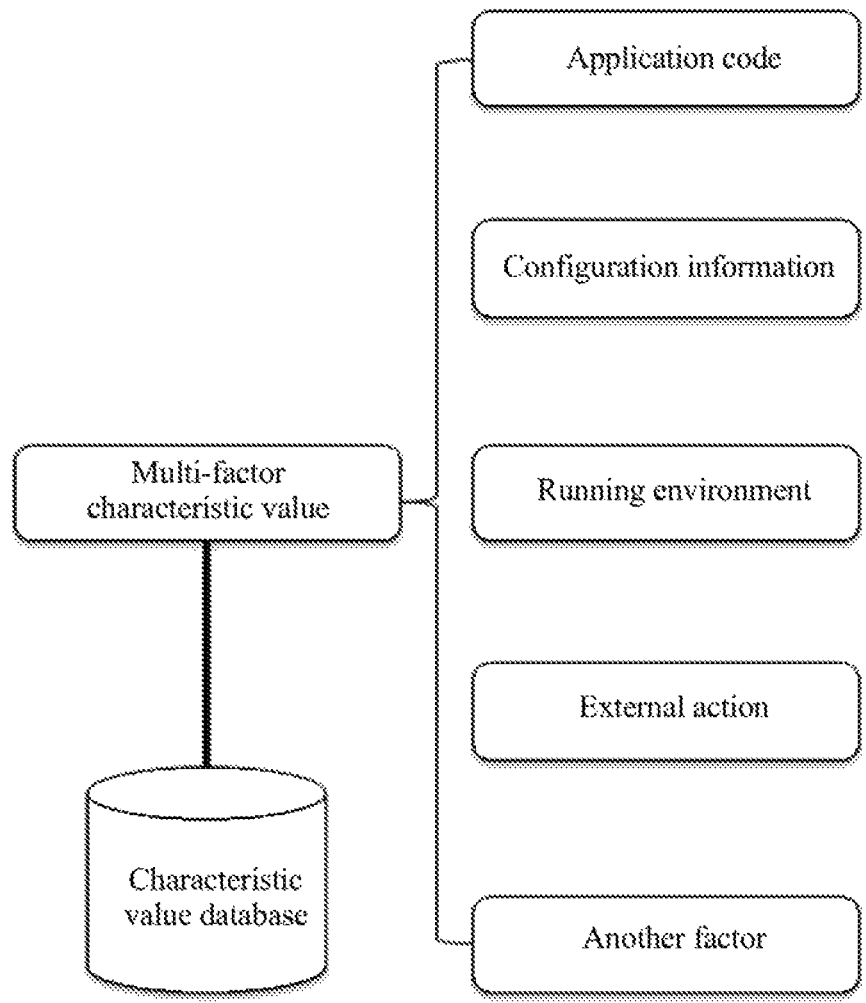
FIG. 4 is a schematic diagram of a multi-factor characteristic value in an embodiment of this application.

The first characteristic value may also be referred to as a multi-factor characteristic value. Referring to FIG. 4, FIG. 4 is a schematic diagram of a multi-factor characteristic value in an embodiment of this application. The first characteristic value saved in the characteristic value database may include at least one of application code, configuration information, a running environment, an external action, or another factor. However, to diversify the characteristic value and improve detection accuracy, the cloud application detection apparatus may take all the foregoing multiple factors into consideration.

The application code is mainly an executable file (English full name: executable file, exe for short) of the cloud application, and includes binary code (English full name: Binary files, Bin for short), a library file (English full name: library, Lib for short), and a script (English full name: Script).

The configuration information is a configuration file (English full name: Config) of the cloud application.

The running environment is running environment information of a virtual machine or a volume execute engine in which the cloud application is located, and includes a background process (English full name: Process), a network port (English full name: Port), a file system (English full name: file system, FS for short), and the like.

The external action is response information (English full name: Response) obtained by accessing the cloud application externally.

The another factor is a collection source that may modify or add an characteristic value by adjusting configuration of the guard agent of the cloud application.

It may be understood that the first characteristic value may include at least one of application code, configuration information, a running environment, an external action, or another factor, the second characteristic value, as the updated first characteristic value, may also include at least one of application code, configuration information, a running environment, an external action, or another factor, and content used for the second characteristic value needs to be consistent with that used for the first characteristic value.

In addition, in this embodiment of this application, after extracting, by using a guard agent, a first characteristic value corresponding to each application instance, a cloud application detection apparatus may further save the first characteristic value in an characteristic value database. All the first characteristic values that are corresponding to the application instances and that are saved in the characteristic value database are consistent. In the foregoing manner, consistent first characteristic values are saved in the characteristic value database, to facilitate subsequent characteristic value update, and characteristic values are saved in the characteristic value database in a unified manner, so that feasibility and utility of the solution are improved.

For ease of understanding, there are two cases in which the cloud application detection apparatus may be triggered to update the first characteristic value and obtain the second characteristic value. The two cases are separately described in the following.

1. The first characteristic value is updated when configuration changes.

Optionally, based on the embodiment corresponding to FIG. 2, in a second optional embodiment of the cloud application detection method provided in the embodiment of this application, the updating the first characteristic value to a second characteristic value when the to-be-detected cloud application meets a preset characteristic value update condition may include:

determining whether configuration or code corresponding to the to-be-detected cloud application changes, and if the configuration or the code corresponding to the to-be-detected cloud application changes, determining that the to-be-detected cloud application meets the preset characteristic value update condition; and determining, according to the first characteristic value corresponding to each application instance, the second characteristic value corresponding to the application instance.

In this embodiment, an implementation for updating the first characteristic value by the cloud application detection apparatus is: determining, by detecting whether the configuration and the code of the cloud application change, whether to perform updating.

Specifically, the cloud application detection apparatus determines whether the configuration of the to-be-detected application changes, and if the configuration of the to-be-detected application changes, it may be considered that an characteristic value of the cloud application needs to be updated. The configuration of the cloud application may include configuration of context (English full name: context), configuration of a port, configuration of a virtual machine, and configuration of the Hypertext Transfer Protocol (English full name: Hypertext Transfer Protocol, Http for short) and other miscellaneous items, and the miscellaneous items may include some plug-ins and the like.

Alternatively, the cloud application detection apparatus may determine whether the code of the to-be-detected application changes, and if the code of the to-be-detected application changes, it may be considered that an characteristic value of the cloud application needs to be updated. The code is a source file written by a programmer with a language supported by a development tool, and is a set of explicit rule systems in which characters, symbols, or signal elements indicate information in a discrete form. A rule for designing the code includes unique certainty, standardization, commonality, extensibility, stability, ease of recognition and memorization, striving for shortness and format unification, and ease of modification.

In addition, in this embodiment of this application, a condition for updating a first characteristic value is provided, that is, a cloud application detection apparatus first determines whether configuration or code corresponding to a to-be-detected cloud application changes, and if the configuration or the code corresponding to the to-be-detected cloud application changes, determines that the to-be-detected cloud application meets a preset characteristic value update condition; and then the cloud application detection apparatus may determine, according to a first characteristic value corresponding to each application instance, a second characteristic value corresponding to the application instance. In the foregoing manner for triggering update of the first characteristic value, each time the first characteristic value is updated, the cloud application detection apparatus may know that the first characteristic value changes, so that the second characteristic value after the changing is obtained. Therefore, a success rate of updating an characteristic value is improved, and computing resources of the cloud application detection apparatus are reduced.

2. The first characteristic value is updated periodically.

Optionally, based on the embodiment corresponding to FIG. 2, in a third optional embodiment of the cloud application detection method provided in the embodiment of this application, the updating the first characteristic value to a second characteristic value when the to-be-detected cloud application meets a preset characteristic value update condition may include:

determining whether a runtime of the to-be-detected cloud application exceeds a preset time, and if the runtime of the to-be-detected cloud application exceeds the preset time, determining that the to-be-detected cloud application meets the preset characteristic value update condition; and determining, according to the first characteristic value corresponding to each application instance, the second characteristic value corresponding to the application instance.

In this embodiment, another implementation for updating the first characteristic value by the cloud application detection apparatus is: periodically updating the first characteristic value.

Specifically, a time interval for automatic detection is preset for the cloud application detection apparatus, that is, the first characteristic value is automatically updated at preset time intervals. It is assumed that the preset time is 10 minutes. If a first characteristic value is obtained at 10 o'clock sharp in the morning, the cloud application detection apparatus controls the guard agent to: update the current characteristic value after 10 minutes, that is, at 10 past 10 in the morning, to obtain a second characteristic value; update the second characteristic value after another 10 minutes, that is, at 20 past 10 in the morning, to obtain a next third characteristic value; and the like. This is merely an example herein, and an characteristic value of the to-be-detected cloud application may be continually updated in actual application.

It should be noted that the preset time may be 5 minutes, or may be 10 minutes, or is another appropriate time, and this is not limited herein.

In addition, in this embodiment of this application, another condition for updating a first characteristic value is provided, that is, a cloud application detection apparatus determines whether a runtime of a to-be-detected cloud application exceeds a preset time, and if yes, determines that the to-be-detected cloud application meets a preset characteristic value update condition; and then determines, according to a first characteristic value corresponding to each application instance, a second characteristic value corresponding to the application instance. In the foregoing manner for triggering update of the first characteristic value, a detection miss rate of the cloud application detection apparatus can be reduced, and utility and effectiveness of the solution are improved in a periodical detection manner.

Optionally, based on the embodiment corresponding to FIG. 2, in a fourth optional embodiment of the cloud application detection method provided in the embodiment of this application, the updating the first characteristic value to a second characteristic value may include:

sending an characteristic value update request to each application instance by using the guard agent, where the characteristic value update request is used for updating the first characteristic value for each application instance; and when each application instance responds to the characteristic value update request, receiving the second characteristic value that is of each application instance and that is obtained after the updating.

In this embodiment, an implementation for triggering the cloud application detection apparatus to update the first characteristic value, to obtain the second characteristic value may be: first sending the characteristic value update request to each application instance by using at least one guard agent. FIG. 3 is still used as an example, and the characteristic value update request is sent to at least one of the guard agent A, the guard agent B, or the guard agent C. The guard agents transmit information to each other, and therefore, an application instance corresponding to each guard agent may be notified that an characteristic value needs to be updated.

After each application instance receives the characteristic value update request, and updates the first characteristic value according to the request, the second characteristic value is obtained. Usually, the first characteristic value in this case is overwritten by the second characteristic value.

In addition, in this embodiment of this application, a cloud application detection apparatus may first send an characteristic value update request to each application instance by using a guard agent. The characteristic value update request is used for updating a first characteristic value for each application instance, and when each application instance responds to the characteristic value update request, a second characteristic value that is of each application instance and that is obtained after the updating is received. Updating the first characteristic value to the second characteristic value for each application instance is triggered in the foregoing manner, so that operability of the solution is improved.

Optionally, based on the embodiment corresponding to FIG. 2, in a fifth optional embodiment of the cloud application detection method provided in the embodiment of this application, after the updating the first characteristic value to a second characteristic value, the method may further include:

saving the second characteristic value in an characteristic value database.

In this embodiment, after each application instance receives an characteristic value update request, and updates the first characteristic value according to the request, the second characteristic value is obtained, and in this case, the cloud application detection apparatus may save, in the characteristic value database, the second characteristic value obtained after the updating. Usually, the first characteristic value in this case is overwritten by the second characteristic value. However, there may be another case: The characteristic value database is divided into multiple modules, one module is configured to save the first characteristic value, and the second characteristic value obtained after the updating may be saved in another module. This is not limited herein.

In addition, in this embodiment of this application, after updating a first characteristic value to a second characteristic value, a cloud application detection apparatus may further save the second characteristic value in an characteristic value database, so that data in the characteristic value database is updated. In the foregoing manner, after the first characteristic value is updated, the second characteristic value is saved in the characteristic value database, and may overwrite the original first characteristic value to facilitate subsequent characteristic value comparison, so that application efficiency of the solution is improved.

Optionally, based on the fifth embodiment corresponding to FIG. 2, in a sixth optional embodiment of the cloud application detection method provided in the embodiment of this application, the determining the to-be-detected cloud application as a target cloud application with security vulnerability if second characteristic values are inconsistent may include:

comparing the second characteristic value of the application instance with a second characteristic value saved in the characteristic value database, where the application instance includes at least one second characteristic value; and determining the to-be-detected cloud application as the target cloud application with security vulnerability if more than N second characteristic values of the application instance are inconsistent with the second characteristic value saved in the characteristic value database, where N is a positive number greater than or equal to 1.

In this embodiment, after updating the first characteristic value to the second characteristic value, the cloud application detection apparatus may determine, by using a preset detection rule, whether the cloud application has security vulnerability.

Specifically, it is assumed that the second characteristic value that is of the to-be-detected cloud application and that is obtained after the updating may include multiple pieces of characteristic information such as Bin, Lib, Config, and FS, and each guard agent extracts the second characteristic value of the application instance corresponding to the guard agent, and saves the second characteristic value in the characteristic value database. Certainly, types of characteristic information included in the second characteristic value are Bin, Lib, Config, and FS. In this case, the cloud application detection apparatus randomly selects a second characteristic value, that is, Bin, Lib, Config, or FS, extracted by one of the guard agents, and then separately compares the second characteristic value with a second characteristic value that is of another application instance and that is saved in the characteristic value database. Specifically, there may be two comparison cases.

Case 1: N is set to 1, that is, it is considered that the to-be-detected cloud application has security vulnerability provided that one piece of characteristic information in Bin, Lib, Config, or FS of the to-be-detected cloud application is inconsistent with another piece of characteristic information saved in the characteristic value database.

Case 2: N is set to a value of (Amount of characteristic information+1)/2. If the amount of characteristic information is 4, N may be set to 2.5, and because the amount cannot be a decimal, N may be set to 3 in a round off manner. That is, when three pieces of characteristic information in Bin, Lib, Config, or FS of the to-be-detected cloud application are inconsistent with another piece of characteristic information saved in the characteristic value database, it is considered that the cloud application has security vulnerability.

If the amount of characteristic information in the second characteristic value is an odd number, a rule that the minority is subordinate to the majority is used when N is set to (Amount of characteristic information+1)/2. That is, when most characteristic information is inconsistent, it may be considered that the current to-be-detected cloud application has security vulnerability.

It should be noted that a value of N may be set according to a situation in actual application, and this is not limited herein.

Further, in this embodiment of this application, a manner for determining, by a cloud application detection apparatus, whether a cloud application has security vulnerability may be: first, comparing a second characteristic value of an application instance with a second characteristic value saved in an characteristic value database, where the application instance includes at least one second characteristic value; and determining the to-be-detected cloud application as a target cloud application with security vulnerability if more than N second characteristic values of the application instance are inconsistent with the second characteristic value saved in the characteristic value database, where N is a positive number greater than or equal to 1. In the foregoing manner for detecting whether the cloud application has security vulnerability, on the one hand, when N is equal to 1, once it is detected that second characteristic values are inconsistent, it is tentatively determined that the cloud application has security vulnerability, so as to improve security of the solution; on the other hand, if N is greater than 1, detection may be performed in a manner that the minority is subordinate to the majority, that is, when a quantity of inconsistent second characteristic values of the application instances is greater than a quantity of consistent second characteristic values, it is considered that the cloud application has security vulnerability, so as to reduce a result of security vulnerability, and improve efficiency of further detection.

Optionally, based on FIG. 2 and the first to the sixth embodiments corresponding to FIG. 2, in a seventh optional embodiment of the cloud application detection method provided in the embodiment of this application, after the determining the to-be-detected cloud application as a target cloud application with security vulnerability, the method may further include:

sending a security alarm for the target cloud application; or migrating the target cloud application; or restoring the target cloud application.

In this embodiment, after the cloud application detection apparatus determines the to-be-detected cloud application as the target cloud application with security vulnerability, processing may be specifically performed in the following three manners.

Manner 1: The security alarm for the target cloud application may be sent to a client. A user learns, by using the client, that the currently-running target cloud application has security vulnerability, and may process the target cloud application manually or according to a preset processing rule. Usually, the security alarm may be displayed on the client by using a pop-up window.

Manner 2: The target cloud application may be migrated. Before migration, a migration scheme is assessed, to ensure successful migration. First, an architecture and a resource use status of an existing system need to be surveyed, and an assessment process needs to include the following information and content.

(1) The cloud application detection apparatus knows a quantity of services supported by an existing system and a distribution status of the service in a server.

(2) The cloud application detection apparatus knows a resource occupation status of an existing physical server, including a central processing unit (English full name: Central Processing Unit, CPU for short), a memory, a disk, and a network connection status. For ensuring successful migration, a specification of a target virtual machine to which the target cloud application is migrated is not lower than a standard of an original physical machine.

(3) The cloud application detection apparatus detects whether a current physical environment supports virtualization and resource expansion, and this is because virtualization needs to be completed on the physical server before the migration.

(4) The cloud application detection apparatus assesses a current storage capacity and current resource utilization, needs to plan, in a target system, storage space required for the migration, and needs to know how to use existing storage.

Manner 3: The target cloud application may be resaved. Specifically, data of the cloud application may be resaved. The data includes data saved in the characteristic value database, and the data of the cloud application. Data restoration may be classified into software fault data restoration and hardware fault data restoration.

Further, in this embodiment of this application, after determining a to-be-detected cloud application as a target cloud application with security vulnerability, a cloud application detection apparatus may send a security alarm for the target cloud application to a client, or migrate the target cloud application, or resave the target cloud application. In the foregoing manner, appropriate processing can be performed on the target cloud application with security vulnerability in time, so that the target cloud application with security vulnerability is found as early as possible, potential risk spreading is prevented, and security of the solution is improved.

Figure 5:
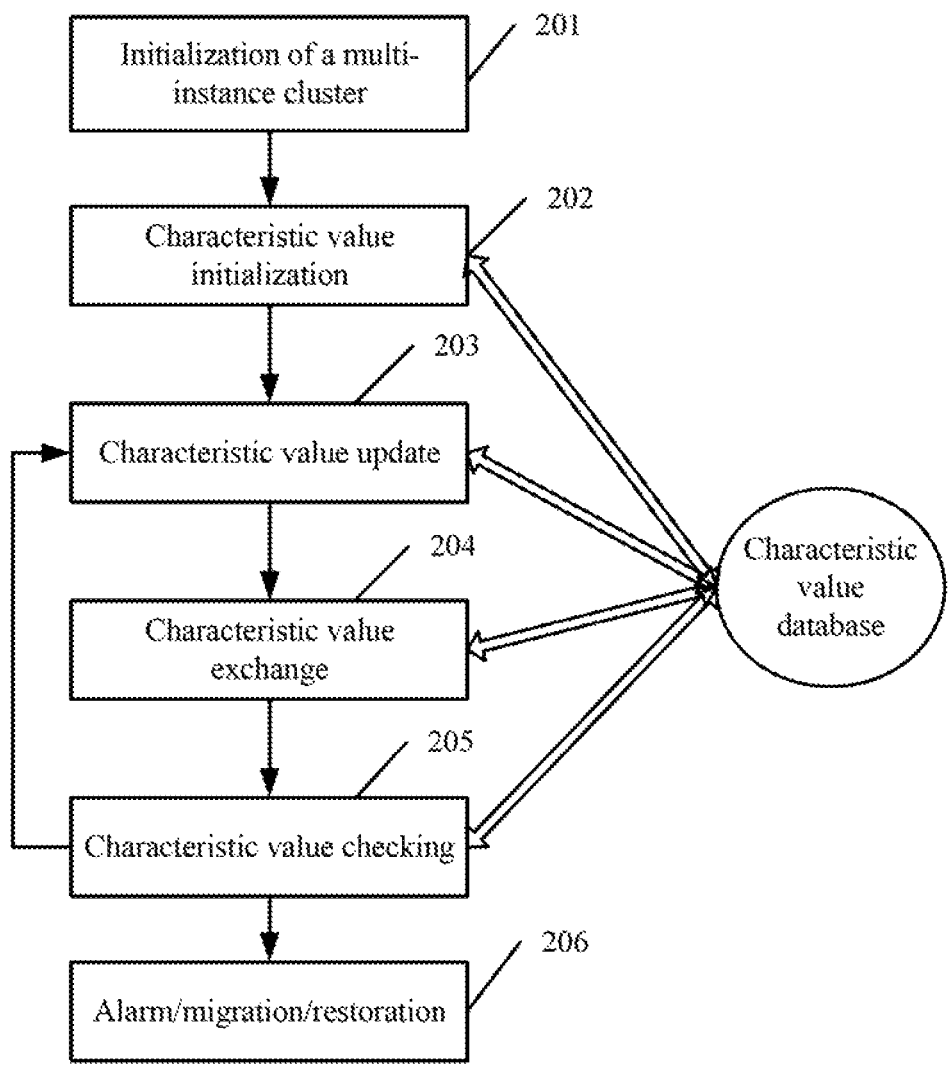
FIG. 5 is a schematic flowchart of checking characteristic values of multiple application instances in an application scenario.

For ease of understanding, the following describes in detail a cloud application detection method in this application by using a specific application scenario. Referring to FIG. 5, FIG. 5 is a schematic flowchart of checking characteristic values of multiple application instances in an application scenario. Specifically:

Step 201: A company A is a cloud service provider. Currently, the company is designing a cloud application, and needs to detect security of the cloud application on a PaaS platform. Therefore, a cloud application detection apparatus is used. At least one guard agent and an characteristic value database are deployed in the cloud application detection apparatus. First, in a deployment stage of the cloud application, the cloud application may be rendered to run multiple copies. Each copy corresponds to one application instance, each application instance corresponds to one guard agent, and the guard agent initializes a guard agent cluster according to a cloud application deployment topology.

Step 202: The guard agent extracts running environment characteristic values, that is, Process, Port, and FS, of the cloud application from a randomly-selected local application instance, saves the characteristic values in the characteristic value database, and exchanges the characteristic values in the guard agent cluster for verification, to determine that running environment characteristic values of the guard agents are consistent.

Step 203: In a running stage of the cloud application, the guard agent is triggered by a change in code and configuration to update the characteristic values of the local application instance, that is, to update the Process, the Port, and the FS, and saves the updated Process, Port, and FS in the characteristic value database.

Step 204: In this case, the guard agent corresponding to the local application instance sends an update notification message to another application instance, so that other guard agents each extract characteristic values such as Process, Port, and FS of each application instance, and also save updated Process, Port, and FS in the characteristic value database.

Step 205: The guard agent of the local application instance extracts an characteristic value of another application instance from the characteristic value database for comparison, where specific comparison content is Process, Port, and FS, and a rule that the minority is subordinate to the majority is used.

Step 206: When the Port and the FS that are extracted by the guard agent corresponding to the local application instance are inconsistent with Port and FS that are saved in the characteristic value database, it may be considered that the cloud application designed by the company A has security vulnerability. In this case, the cloud application may be processed in a processing manner of initiating an alarm, migration, or restoration, so as to prevent a security issue.

Figure 6:
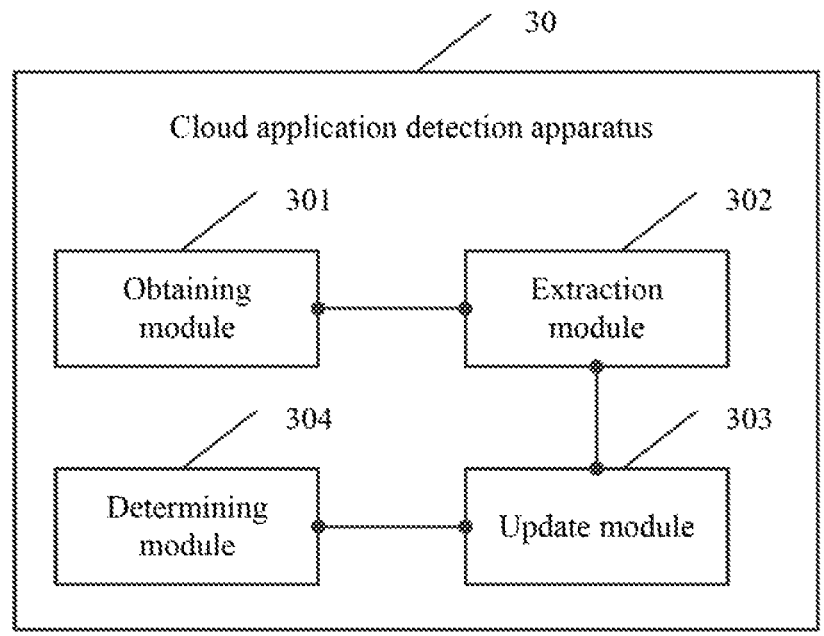
FIG. 6 is a schematic diagram of an embodiment of a cloud application detection apparatus in an embodiment of this application.

The following describes in detail a cloud application detection apparatus in this application. Referring to FIG. 6, a cloud application detection apparatus in an embodiment of this application includes:

an obtaining module 301, configured to obtain at least one application instance corresponding to a to-be-detected cloud application, where the application instance corresponds one-to-one to a guard agent;

an extraction module 302, configured to extract, by using the guard agent, a first characteristic value corresponding to each application instance obtained by the obtaining module 301;

an update module 303, configured to update the first characteristic value extracted by the extraction module 302 to a second characteristic value when the to-be-detected cloud application meets a preset characteristic value update condition; and a determining module 304, configured to determine the to-be-detected cloud application as a target cloud application with security vulnerability if the second characteristic values obtained by the update module by means of updating 303 are inconsistent.

In this embodiment, an obtaining module 301 obtains at least one application instance corresponding to a to-be-detected cloud application, where the application instance corresponds one-to-one to a guard agent; an extraction module 302 extracts, by using the guard agent, a first characteristic value corresponding to each application instance obtained by the obtaining module 301; the update module 303 updates the first characteristic value extracted by the extraction module 302 to a second characteristic value when the to-be-detected cloud application meets a preset characteristic value update condition; and the determining module 304 determines the to-be-detected cloud application as a target cloud application with security vulnerability if the second characteristic values obtained by the update module by means of updating 303 are inconsistent.

According to the cloud application detection method provided in this embodiment of this application, a cloud application detection apparatus first obtains at least one application instance corresponding to a to-be-detected cloud application, where the application instance corresponds one-to-one to a guard agent; then extracts, by using the guard agent, a first characteristic value corresponding to each application instance; may update the first characteristic value to a second characteristic value when the to-be-detected cloud application meets a preset characteristic value update condition; and determines the to-be-detected cloud application as a target cloud application with security vulnerability if second characteristic values are inconsistent. According to the foregoing method, integrity protection during running can be provided for a cloud application deployed on a PaaS platform, a first characteristic value of the cloud application is updated during running, a second characteristic value is obtained after the updating, and further consistency of second characteristic values is determined, so as to find, in time, whether the cloud application has security vulnerability. Therefore, a security service capability of the PaaS platform is improved, market competitiveness is improved, and a user can learn a running status of the cloud application in time, so that the cloud application and a running environment of the cloud application are prevented from being maliciously tampered with or from abnormal running, user experience is improved, and a cloud service function is enhanced.

Figure 7:
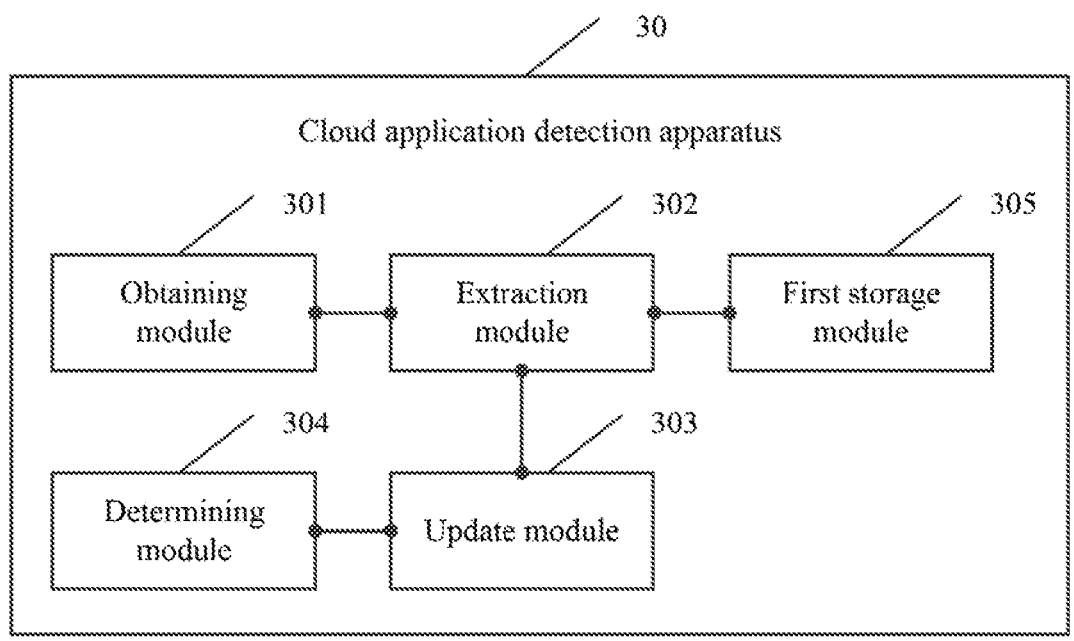
FIG. 7 is a schematic diagram of another embodiment of a cloud application detection apparatus in an embodiment of this application.

Optionally, based on the embodiment corresponding to FIG. 6, referring to FIG. 7, in another embodiment of the cloud application detection apparatus provided in the embodiment of this application, the cloud application detection apparatus 30 further includes:

a first storage module 305, configured to save the first characteristic value in an characteristic value database after the extraction module 302 extracts, by using the guard agent, the first characteristic value corresponding to each application instance, where all the first characteristic values that are corresponding to the application instances and that are saved in the characteristic value database are consistent.

In addition, in this embodiment of this application, after extracting, by using a guard agent, a first characteristic value corresponding to each application instance, the cloud application detection apparatus may further save the first characteristic value in an characteristic value database. All the first characteristic values that are corresponding to the application instances and that are saved in the characteristic value database are consistent. In the foregoing manner, consistent first characteristic values are saved in the characteristic value database, to facilitate subsequent characteristic value update, and characteristic values are saved in the characteristic value database in a unified manner, so that feasibility and utility of the solution are improved.

Figure 8:
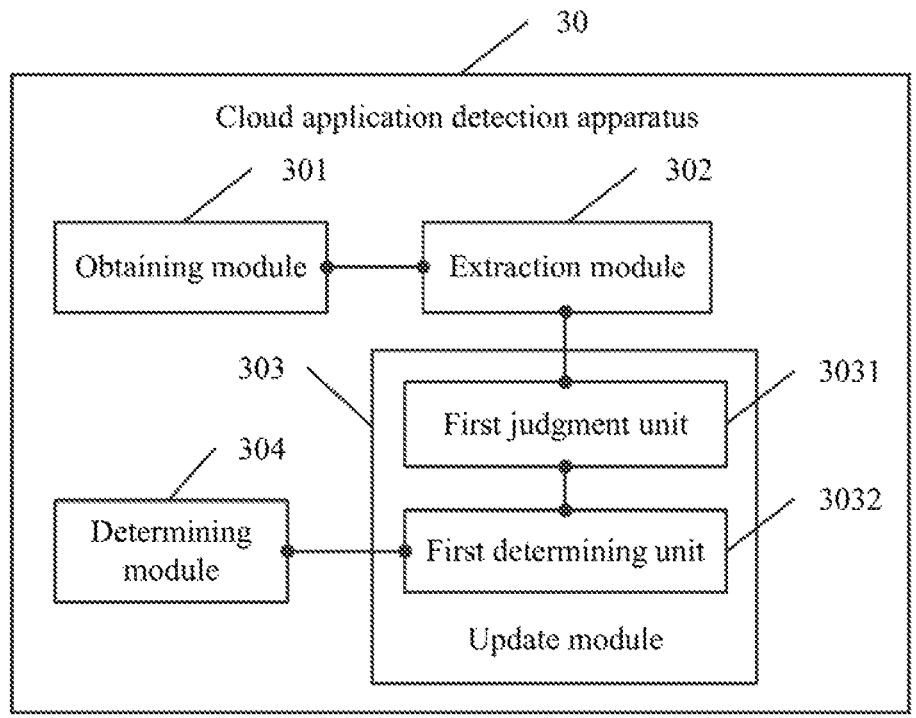
FIG. 8 is a schematic diagram of another embodiment of a cloud application detection apparatus in an embodiment of this application.

Optionally, based on the embodiment corresponding to FIG. 6, referring to FIG. 8, in another embodiment of the cloud application detection apparatus provided in the embodiment of this application, the update module 303 includes:

a first judgment unit 3031, configured to: determine whether configuration or code corresponding to the to-be-detected cloud application changes, and if the configuration or the code corresponding to the to-be-detected cloud application changes, determine that the to-be-detected cloud application meets the preset characteristic value update condition; and a first determining unit 3032, configured to: after the first judgment unit 3031 determines that the to-be-detected cloud application meets the preset characteristic value update condition, determine, according to the first characteristic value corresponding to each application instance, the second characteristic value corresponding to the application instance.

In addition, in this embodiment of this application, a condition for updating a first characteristic value is provided, that is, the cloud application detection apparatus first determines whether configuration or code corresponding to a to-be-detected cloud application changes, and if the configuration or the code corresponding to the to-be-detected cloud application changes, determines that the to-be-detected cloud application meets a preset characteristic value update condition; and then the cloud application detection apparatus may determine, according to a first characteristic value corresponding to each application instance, a second characteristic value corresponding to the application instance. In the foregoing manner for triggering update of the first characteristic value, each time the first characteristic value is updated, the cloud application detection apparatus may know that the first characteristic value changes, so that the second characteristic value after the changing is obtained. Therefore, a success rate of updating an characteristic value is improved, and computing resources of the cloud application detection apparatus are reduced.

Figure 9:
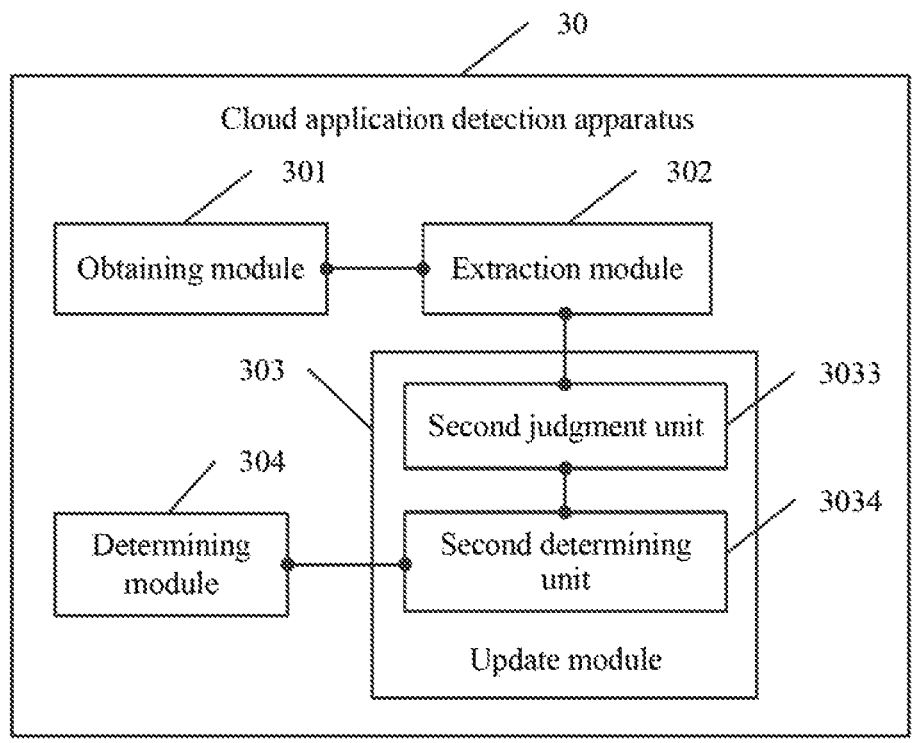
FIG. 9 is a schematic diagram of another embodiment of a cloud application detection apparatus in an embodiment of this application.

Optionally, based on the embodiment corresponding to FIG. 6, referring to FIG. 9, in another embodiment of the cloud application detection apparatus provided in the embodiment of this application, the update module 303 includes:

a second judgment unit 3033, configured to: determine whether a runtime of the to-be-detected cloud application exceeds a preset time, and if the runtime of the to-be-detected cloud application exceeds the preset time, determine that the to-be-detected cloud application meets the preset characteristic value update condition; and a second determining unit 3034, configured to: after the second judgment unit 3033 determines that the to-be-detected cloud application meets the preset characteristic value update condition, determine, according to the first characteristic value corresponding to each application instance, the second characteristic value corresponding to the application instance.

In addition, in this embodiment of this application, another condition for updating a first characteristic value is provided, that is, the cloud application detection apparatus determines whether a runtime of a to-be-detected cloud application exceeds a preset time, and if yes, determines that the to-be-detected cloud application meets a preset characteristic value update condition; and then determines, according to a first characteristic value corresponding to each application instance, a second characteristic value corresponding to the application instance. In the foregoing manner for triggering update of the first characteristic value, a detection miss rate of the cloud application detection apparatus can be reduced, and utility and effectiveness of the solution are improved in a periodical detection manner.

Figure 10:
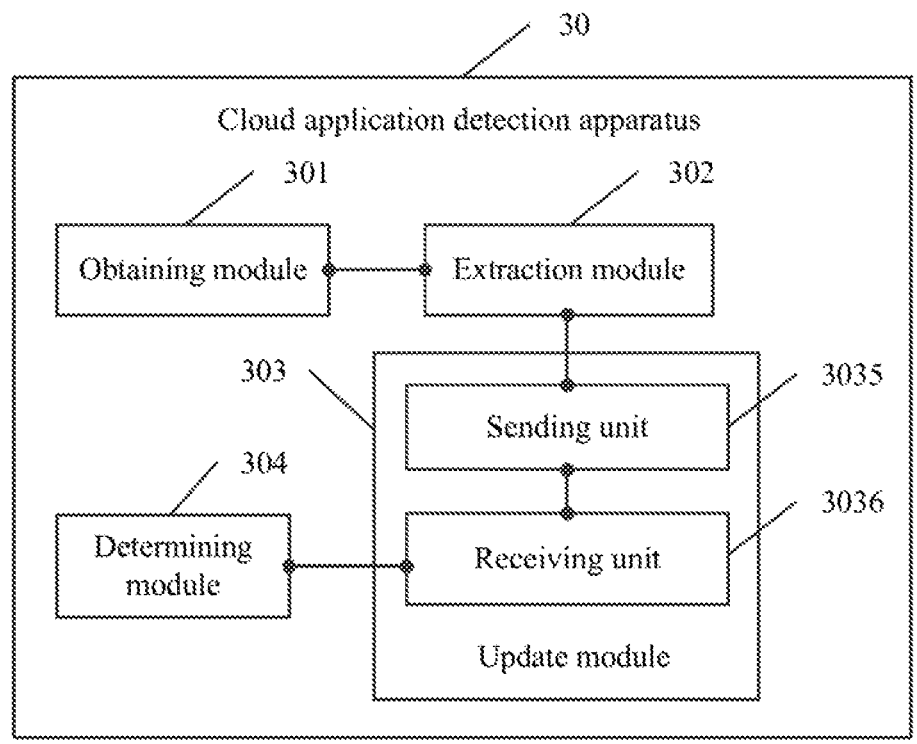
FIG. 10 is a schematic diagram of another embodiment of a cloud application detection apparatus in an embodiment of this application.

Optionally, based on the embodiment corresponding to FIG. 6, referring to FIG. 10, in another embodiment of the cloud application detection apparatus provided in the embodiment of this application, the update module 303 includes:

a sending unit 3035, configured to send a characteristic value update request to each application instance by using the guard agent, where the characteristic value update request is used for updating the first characteristic value for each application instance; and a receiving unit 3036, configured to: when each application instance responds to the characteristic value update request sent by the sending unit 3035, receive the second characteristic value that is of each application instance and that is obtained after the updating.

In addition, in this embodiment of this application, the cloud application detection apparatus may first send an characteristic value update request to each application instance by using a guard agent. The characteristic value update request is used for updating a first characteristic value for each application instance, and when each application instance responds to the characteristic value update request, a second characteristic value that is of each application instance and that is obtained after the updating is received. Updating the first characteristic value to the second characteristic value for each application instance is triggered in the foregoing manner, so that operability of the solution is improved.

Figure 11:
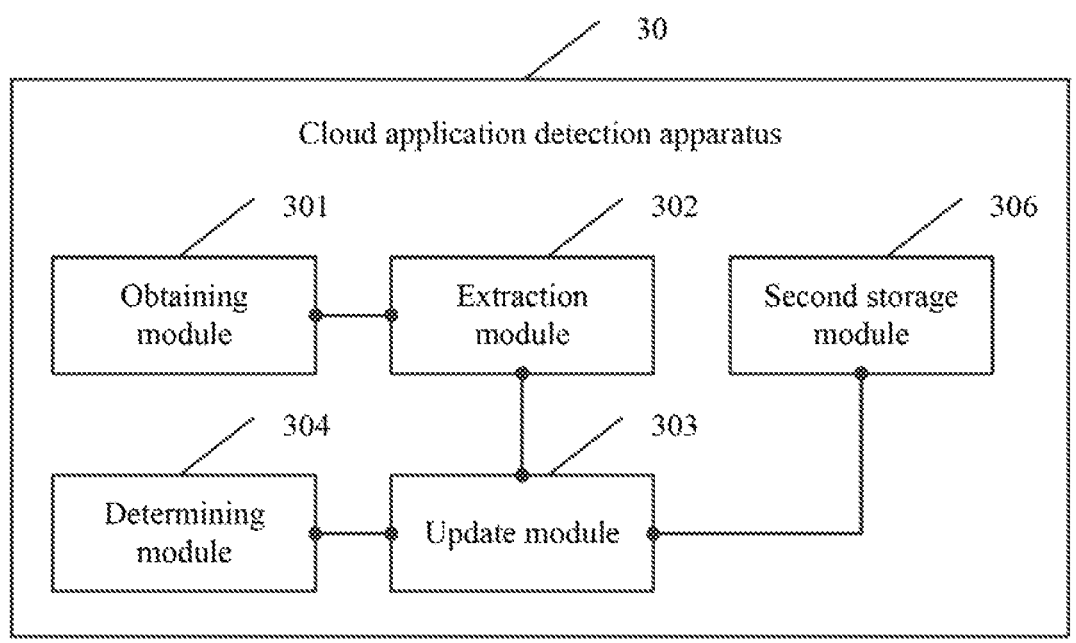
FIG. 11 is a schematic diagram of another embodiment of a cloud application detection apparatus in an embodiment of this application.

Optionally, based on the embodiment corresponding to FIG. 6, referring to FIG. 11, in another embodiment of the cloud application detection apparatus provided in the embodiment of this application, the cloud application detection apparatus 30 further includes:

a second storage module 306, configured to save the second characteristic value in the characteristic value database after the update module 303 updates the first characteristic value to the second characteristic value.

In addition, in this embodiment of this application, after updating a first characteristic value to a second characteristic value, the cloud application detection apparatus may further save the second characteristic value in an characteristic value database, so that data in the characteristic value database is updated. In the foregoing manner, after the first characteristic value is updated, the second characteristic value is saved in the characteristic value database, and may overwrite the original first characteristic value to facilitate subsequent characteristic value comparison, so that application efficiency of the solution is improved.

Figure 12:
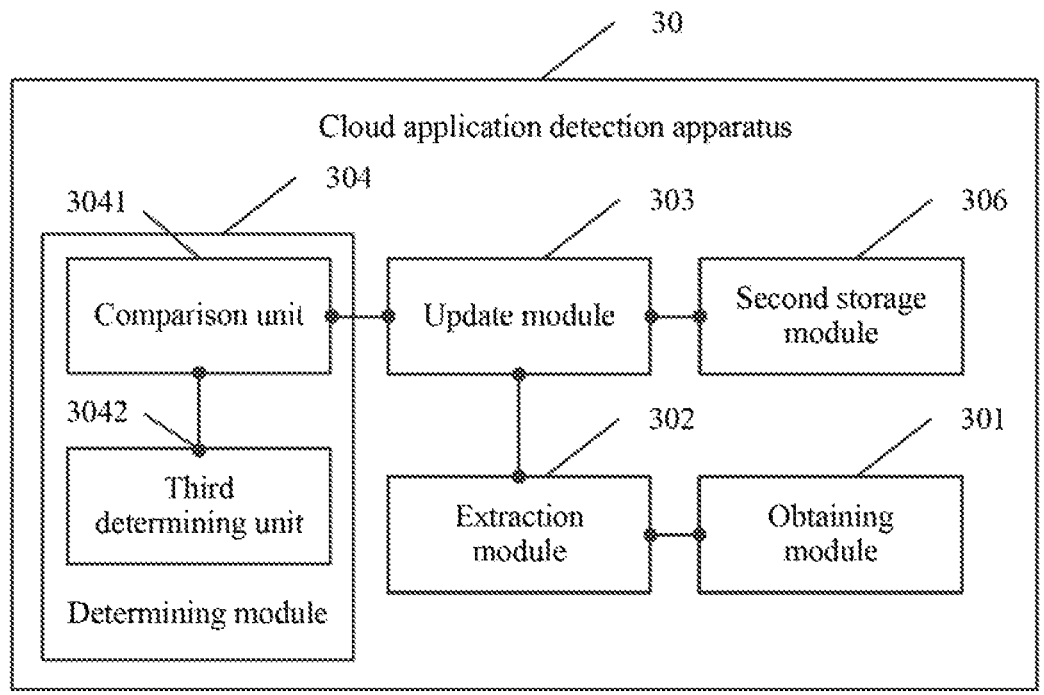
FIG. 12 is a schematic diagram of another embodiment of a cloud application detection apparatus in an embodiment of this application.

Optionally, based on the embodiment corresponding to FIG. 11, referring to FIG. 12, in another embodiment of the cloud application detection apparatus provided in the embodiment of this application, the determining module 304 includes:

a comparison unit 3041, configured to compare the second characteristic value of the application instance with a second characteristic value saved in the characteristic value database, where the application instance includes at least one second characteristic value; and a third determining unit 3042, configured to determine the to-be-detected cloud application as the target cloud application with security vulnerability if it is learned, after the comparison unit 3041 performs the comparison, that more than N second characteristic values of the application instance are inconsistent with the second characteristic value saved in the characteristic value database, where N is a positive number greater than or equal to 1.

Further, in this embodiment of this application, a manner for determining, by the cloud application detection apparatus, whether a cloud application has security vulnerability may be: first, comparing a second characteristic value of an application instance with a second characteristic value saved in an characteristic value database, where the application instance includes at least one second characteristic value, and determining the to-be-detected cloud application as a target cloud application with security vulnerability if more than N second characteristic values of the application instance are inconsistent with the second characteristic value saved in the characteristic value database, where N is a positive number greater than or equal to 1. In the foregoing manner for detecting whether the cloud application has security vulnerability, on the one hand, when N is equal to 1, once it is detected that second characteristic values are inconsistent, it is tentatively determined that the cloud application has security vulnerability, so as to improve security of the solution; on the other hand, if N is greater than 1, detection may be performed in a manner that the minority is subordinate to the majority, that is, when a quantity of inconsistent second characteristic values of the application instances is greater than a quantity of consistent second characteristic values, it is considered that the cloud application has security vulnerability, so as to reduce a result of security vulnerability, and improve efficiency of further detection.

Figure 13:
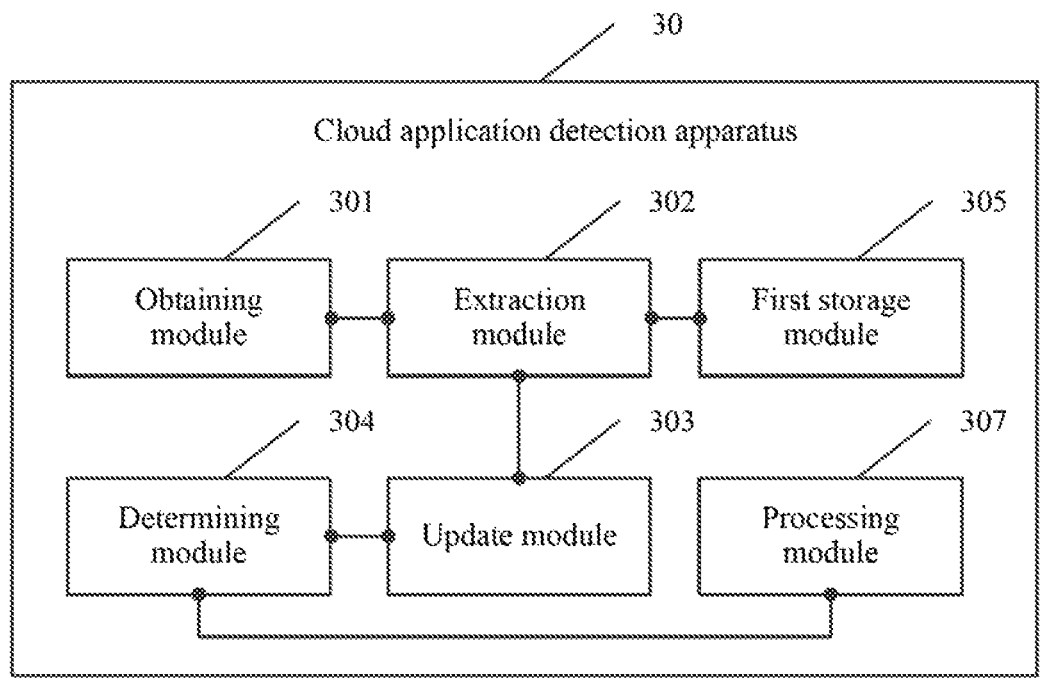
FIG. 13 is a schematic diagram of another embodiment of a cloud application detection apparatus in an embodiment of this application.

Optionally, based on the embodiment corresponding to any one of FIG. 6 to FIG. 12, referring to FIG. 13, in another embodiment of the cloud application detection apparatus provided in the embodiment of this application, the cloud application detection apparatus 30 further includes:

a processing module 307, configured to: after the determining module 304 determines the to-be-detected cloud application as the target cloud application with security vulnerability, send a security alarm for the target cloud application, or migrate the target cloud application, or resave the target cloud application.

Further, in this embodiment of this application, after determining a to-be-detected cloud application as a target cloud application with security vulnerability, the cloud application detection apparatus may send a security alarm for the target cloud application to a client, or migrate the target cloud application, or resave the target cloud application. In the foregoing manner, appropriate processing can be performed on the target cloud application with security vulnerability in time, so that the target cloud application with security vulnerability is found as early as possible, potential risk spreading is prevented, and security of the solution is improved.

Figure 14:
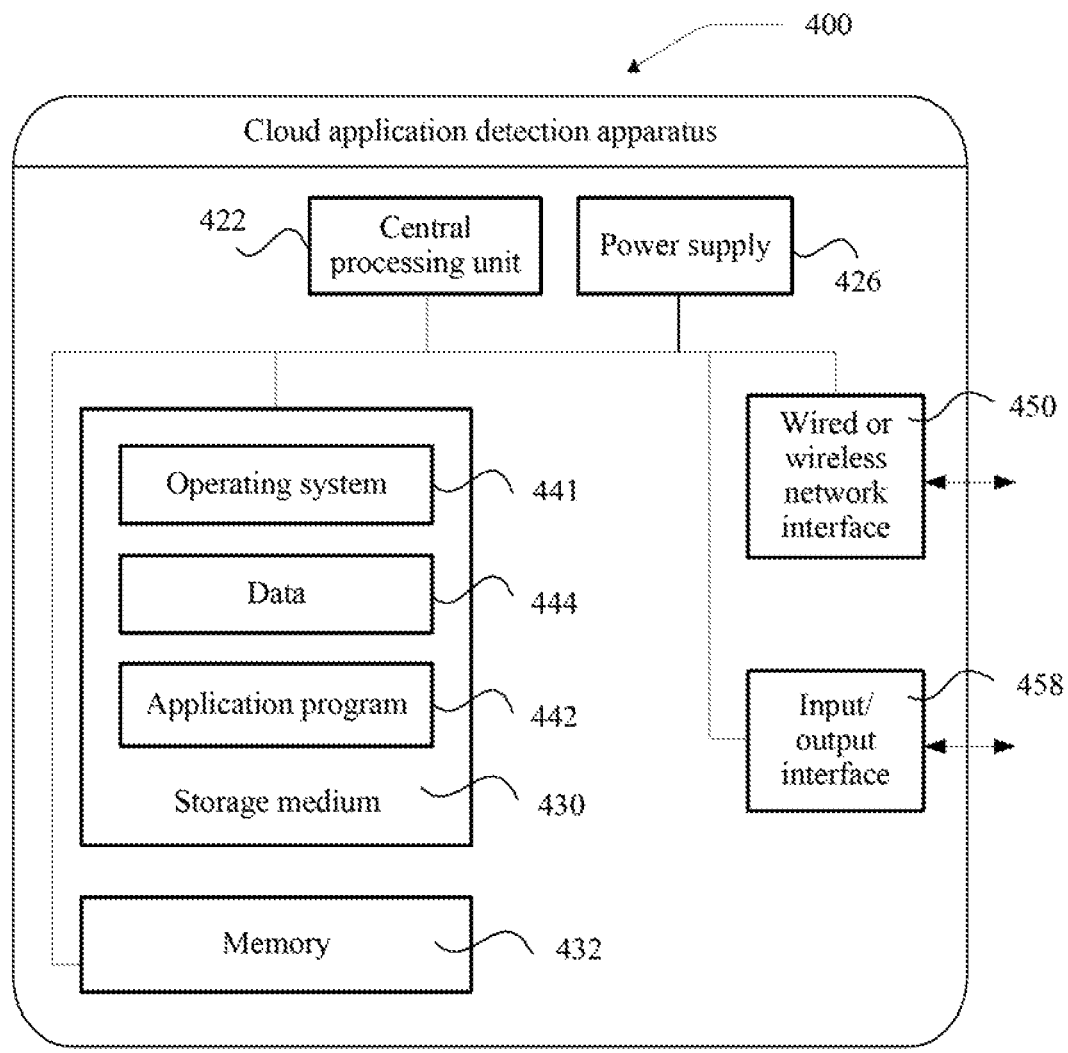
FIG. 14 is a schematic structural diagram of a cloud application detection apparatus in an embodiment of this application.

FIG. 14 is a schematic structural diagram of a cloud application detection apparatus in an embodiment of this application. The cloud application detection apparatus 400 may differ greatly due to a difference in configuration or performance. The cloud application detection apparatus 400 may include one or more central processing units (English full name: central processing units, CPU for short) 422 (for example, one or more processors), one or more memories 432, and one or more storage media 430 (for example, one or more mass storage devices) used for storing an application program 442 or data 444. The memory 432 and the storage medium 430 may be transient storage or persistent storage. Programs saved in the storage medium 430 may include one or more foregoing modules (which are not marked in the figure), and each module may include a series of instructions and operations performed on the cloud application detection apparatus. Further, the central processing unit 422 may be set to communicate with the storage medium 430, and perform, on the cloud application detection apparatus 400, the series of instructions and operations in the storage medium 430.

The cloud application detection apparatus 400 may further include one or more power supplies 426, one or more wired or wireless network interfaces 450, one or more input/output interfaces 458, and/or one or more operating systems 441, such as Windows Server™, Mac OS X™, Unix™, Linux™, or FreeBSD™.

The steps performed by the cloud application detection apparatus in the foregoing embodiments may be based on a cloud application detection apparatus structure shown in FIG. 14.

The central processing unit 422 is configured to:

obtain at least one application instance corresponding to a to-be-detected cloud application, where the application instance corresponds one-to-one to a guard agent;

extract, by using the guard agent, a first characteristic value corresponding to each application instance;

update the first characteristic value to a second characteristic value when the to-be-detected cloud application meets a preset characteristic value update condition; and determine the to-be-detected cloud application as a target cloud application with security vulnerability if the second characteristic values are inconsistent.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be saved in a computer-readable storage medium. Based on such an understanding, the technical solutions of the present application essentially, or the part contributing to the prior art, or all or a part of the technical solutions may be implemented in the form of a software product. The software product is saved in a storage medium and includes several instructions for instructing a computer device (which may be a personal computer, a server, or a network device) to perform all or a part of the steps of the methods described in the embodiments of the present application. The foregoing storage medium includes: any medium that can save program code, such as a USB flash drive, a read-only memory (English full name: Read-Only Memory, ROM for short), a random access memory (English full name: Random Access Memory, RAM for short), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A cloud application detection method, comprising:
   obtaining at least one application instance corresponding to a to-be-detected cloud application, wherein the application instance corresponds one-to-one to a guard agent;
   extracting, by using the guard agent, a first characteristic value corresponding to each application instance;
   updating the first characteristic value to a second characteristic value when the to-be-detected cloud application meets a preset characteristic value update condition; and
   determining the to-be-detected cloud application as a target cloud application with security vulnerability if there is an inconsistency with respect to the second characteristic value.

2. The method according to claim 1, wherein after the extracting, by using the guard agent, a first characteristic value corresponding to each application instance, the method further comprises:
   saving the first characteristic value in an characteristic value database, wherein all the first characteristic values that are corresponding to the application instances and that are saved in the characteristic value database are consistent.

3. The method according to claim 1, wherein the updating the first characteristic value to a second characteristic value when the to-be-detected cloud application meets a preset characteristic value update condition comprises:
   determining whether configuration or code corresponding to the to-be-detected cloud application changes, and if the configuration or the code corresponding to the to-be-detected cloud application changes, determining that the to-be-detected cloud application meets the preset characteristic value update condition; and
   determining, according to the first characteristic value corresponding to each application instance, the second characteristic value corresponding to the application instance.

4. The method according to claim 1, wherein the updating the first characteristic value to a second characteristic value when the to-be-detected cloud application meets a preset characteristic value update condition comprises:
   determining whether a runtime of the to-be-detected cloud application exceeds a preset time, and if the runtime of the to-be-detected cloud application exceeds the preset time, determining that the to-be-detected cloud application meets the preset characteristic value update condition; and
   determining, according to the first characteristic value corresponding to each application instance, the second characteristic value corresponding to the application instance.

5. The method according to claim 1, wherein the updating the first characteristic value to a second characteristic value comprises:
   sending the characteristic value update request to each application instance by using the guard agent, wherein the characteristic value update request is used for updating the first characteristic value for each application instance; and
   when each application instance responds to the characteristic value update request, receiving the second characteristic value that is of each application instance and that is obtained after the updating.

6. The method according to claim 1, wherein after the updating the first characteristic value to a second characteristic value, the method further comprises:
   saving the second characteristic value in the characteristic value database.

7. The method according to claim 6, wherein the determining the to-be-detected cloud application as a target cloud application with security vulnerability comprises:
   comparing the second characteristic value of the application instance with a second characteristic value saved in the characteristic value database, wherein the application instance comprises at least one second characteristic value; and
   determining the to-be-detected cloud application as the target cloud application with security vulnerability if more than N second characteristic values of the application instance are inconsistent with the second characteristic value saved in the characteristic value database, wherein N is a positive number greater than or equal to 1.

8. The method according to claim 1, wherein after the determining the to-be-detected cloud application as a target cloud application with security vulnerability, the method further comprises:
   sending a security alarm for the target cloud application; or
   migrating the target cloud application; or
   restoring the target cloud application.

9. A cloud application detection apparatus, comprising:
   at least one storage media storing one or more programs, the one or more programs including a plurality of modules, wherein each module among the plurality of modules includes respective instructions and operations, the plurality of modules including an obtaining module, an extraction module, an update module, and a determining module;
   at least one processor operable to communicate with the at least one storage media and to perform, on the cloud application detection apparatus, the respective instructions and operations,
   wherein:
   the obtaining module is configured so that when executed by the at least one processor, at least one application instance corresponding to a to-be-detected cloud application is obtained, wherein the application instance corresponds one-to-one to a guard agent;
   the extraction module is configured so that when executed by the at least one processor, a first characteristic value corresponding to each application instance obtained by the obtaining module is extracted by using the guard agent;
   the update module is configured so that when executed by the at least one processor, the first characteristic value extracted by the extraction module is updated to a second characteristic value when the to-be-detected cloud application meets a preset characteristic value update condition; and the determining module is configured so that when executed by the at least one processor, the to-be-detected cloud application is determined as a target cloud application with security vulnerability if there is an inconsistency with respect to the second characteristic value obtained by the update module by the updating.

10. The cloud application detection apparatus according to claim 9, wherein the the plurality of modules further comprises a storage module, wherein
the storage module is configured so that when executed by the at least one processor, the first characteristic value is saved in a characteristic value database after the extraction module extracts, by using the guard agent, the first characteristic value corresponding to each application instance,
wherein all the first characteristic values that are corresponding to the application instances and that are saved in the characteristic value database are consistent.

11. The cloud application detection apparatus according to claim 9, wherein the update module comprises:
a judgment section, configured to: determine whether configuration or code corresponding to the to-be-detected cloud application changes, and if the configuration or the code corresponding to the to-be-detected cloud application changes, determine that the to-be-detected cloud application meets the preset characteristic value update condition; and
a determining section, configured to: after the judgment section determines that the to-be-detected cloud application meets the preset characteristic value update condition, determine, according to the first characteristic value corresponding to each application instance, the second characteristic value corresponding to the application instance.

12. The cloud application detection apparatus according to claim 9, wherein the update module comprises:
a judgment section, configured to: determine whether a runtime of the to-be-detected cloud application exceeds a preset time, and if the runtime of the to-be-detected cloud application exceeds the preset time, determine that the to-be-detected cloud application meets the preset characteristic value update condition; and
a determining section, configured to: after the judgment section determines that the to-be-detected cloud application meets the preset characteristic value update condition, determine, according to the first characteristic value corresponding to each application instance, the second characteristic value corresponding to the application instance.

13. The cloud application detection apparatus according to claim 9, wherein the update module comprises:
a sending section, configured to send a characteristic value update request to each application instance by using the guard agent, wherein the characteristic value update request is used for updating the first characteristic value for each application instance; and
a receiving section, configured to: when each application instance responds to the characteristic value update request sent by the sending section, receive the second characteristic value that is of each application instance and that is obtained after the updating.

14. The cloud application detection apparatus according to claim 9, wherein the plurality of modules further comprises a storage module, wherein:
the storage module is configured so that when executed by the at least one processor, the second characteristic value is saved in a characteristic value database after the update module updates the first characteristic value to the second characteristic value.

15. The cloud application detection apparatus according to claim 14, wherein the determining module comprises:
a comparison section, configured to compare the second characteristic value of the application instance with a second characteristic value saved in the characteristic value database, wherein the application instance comprises at least one second characteristic value; and
a determining section, configured to determine the to-be-detected cloud application as the target cloud application with security vulnerability if it is learned, after the comparison unit performs the comparison, that more than N second characteristic values of the application instance are inconsistent with the second characteristic value saved in the characteristic value database, wherein N is a positive number greater than or equal to 1.

16. The cloud application detection apparatus according to claim 9, wherein the plurality of modules further comprises a processing module, wherein:
the processing module is configured so that when executed by the at least one processor:
after the determining module determines the to-be-detected cloud application as the target cloud application with security vulnerability, a security alarm for the target cloud application is sent, or
the target cloud application is migrated, or
the target cloud application is resaved.

17. A cloud application detection apparatus, comprising a memory, a transceiver, a processor, and a bus system, wherein
the memory is configured to save a program;
the processor is configured to execute the program saved in the memory, and specific steps are as follows:
obtaining at least one application instance corresponding to a to-be-detected cloud application, wherein the application instance corresponds one-to-one to a guard agent;
extracting, by using the guard agent, a first characteristic value corresponding to each application instance;
updating the first characteristic value to a second characteristic value when the to-be-detected cloud application meets a preset characteristic value update condition; and
determining the to-be-detected cloud application as a target cloud application with security vulnerability if second characteristic values are inconsistent; and
the bus system is configured to connect the memory, the transceiver, and the processor, so that the memory, the transceiver, and the processor communicate with each other.

* * * * *